Jan. 3, 1956     C. W. BURNHAM     2,728,967
SAFETY HOOK
Filed Feb. 11, 1953     2 Sheets-Sheet 1
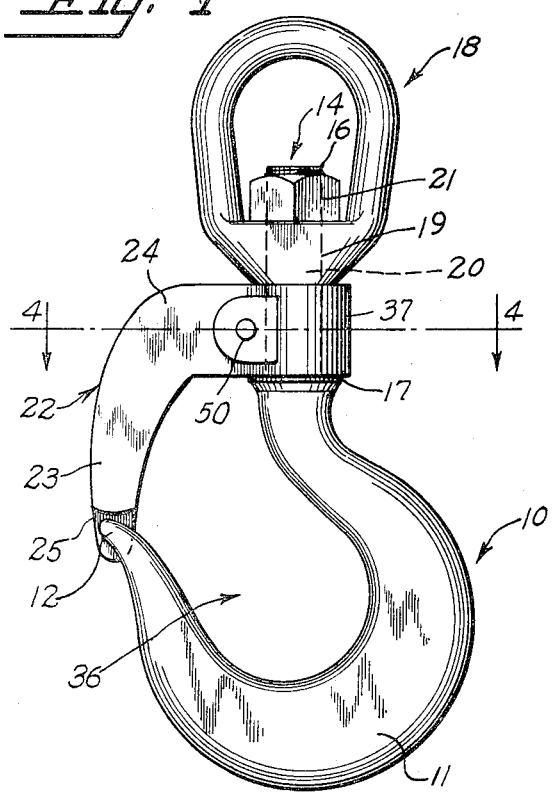
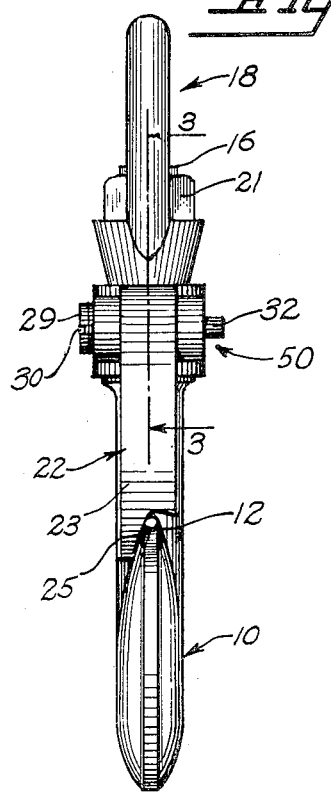
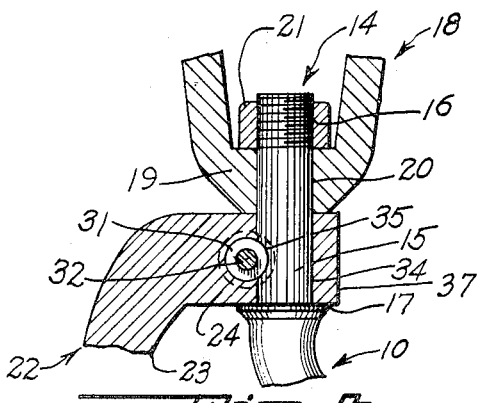
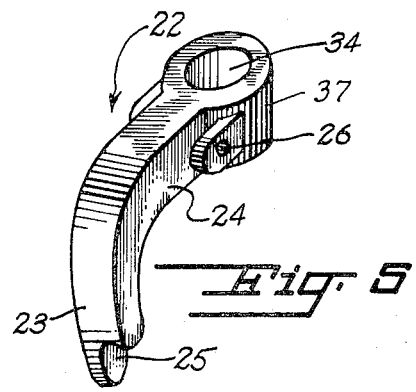
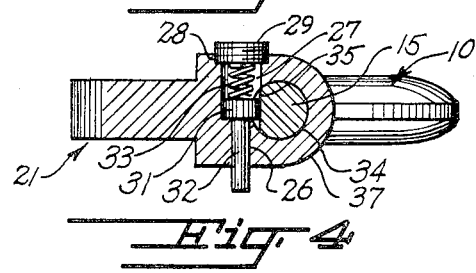
INVENTOR
Claude William Burnham Jan. 3, 1956  C. W. BURNHAM  2,728,967
SAFETY HOOK
Filed Feb. 11, 1953  2 Sheets-Sheet 2
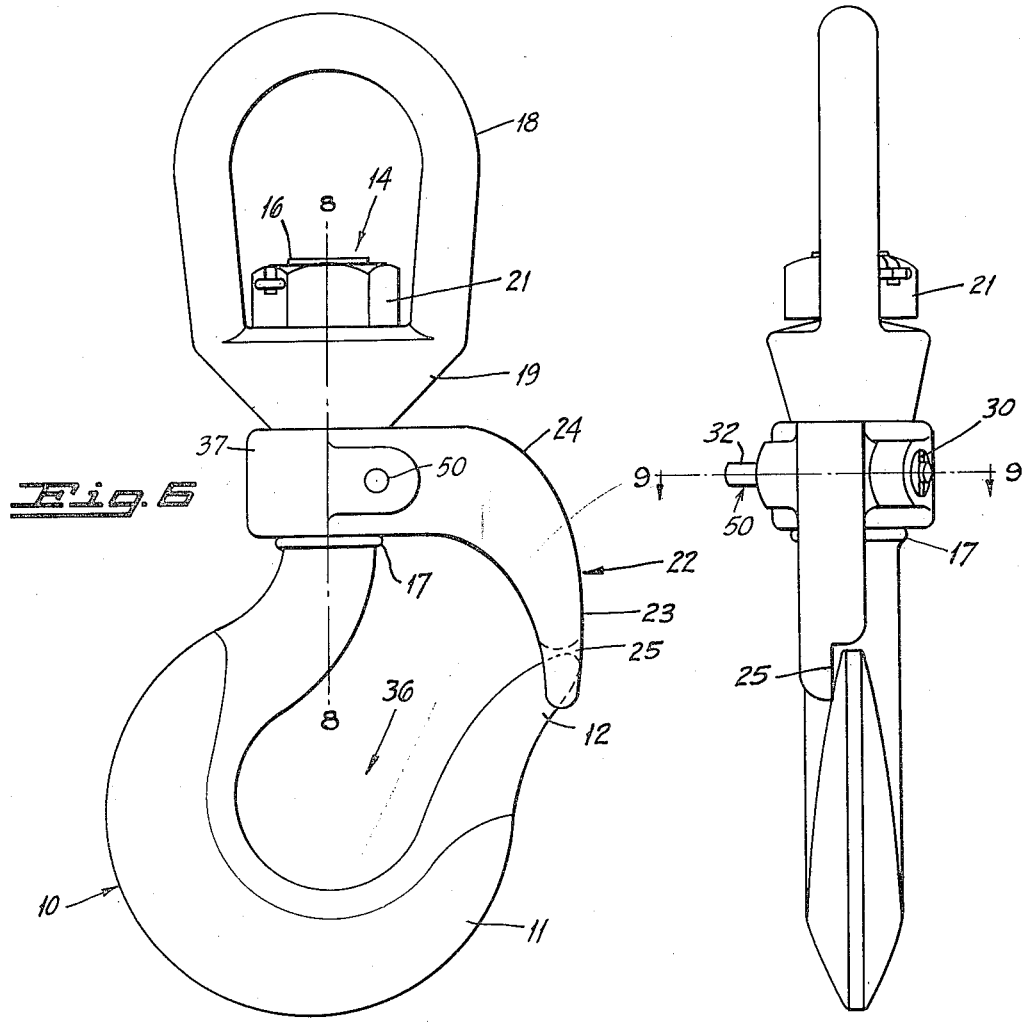
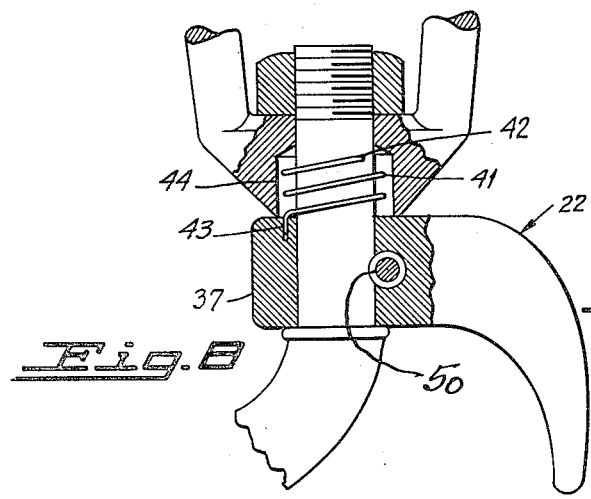
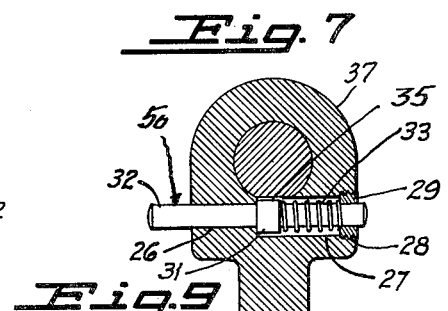
INVENTOR.
Claude William Burnham
ECKHOFF & SLICK
ATTORNEYS
BY
A MEMBER OF THE FIRM

United States Patent Office 2,728,967
Patented Jan. 3, 1956

2,728,967
SAFETY HOOK

Claude William Burnham, Sacramento, Calif., assignor to E. D. Bullard Company, a corporation of California Application February 11, 1953, Serial No. 336,347

7 Claims. (Cl. 24—241)

This invention relates to handling or hoisting devices, and more particularly to a safety hook.

The object of the invention is to provide a safety hook which is adapted to be attached to a hoisting line or the like, there being a lock for preventing accidental disengagement of the hook from the sling, line, or other object being lifted or handled.

Another object of the invention is to provide a safety hook which includes a latch or lock for maintaining the hook locked onto a sling, line, or cable, there being a manually operable means for permitting the unlocking of the latch member when the hook is to be released, or when the latch is not required.

A still further object of the invention is to provide a safety hook which is ruggedly constructed and which includes a wide throat which will receive slings of various sizes, the safety hook of the present invention eliminating trouble with twisting ropes or blocks, and wherein instant operation and positive locking in closed position is ensured, even though a substantial unlocking force is applied by accident.

Still another object of the invention is to provide a safety hook which includes parts that can be readily replaced and which can be made in various sizes to accommodate different sizes of blocks, the hook of the present invention adapted to be used for various items such as snatch blocks, coffin hoists and the like.

A further object of the invention is to provide a safety hook which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the safety hook, constructed according to the present invention.

Figure 2 is an end elevational view of the safety hook of the present invention.

Figure 3 is a sectional view taken on the line 3—3 of Figure 2.

Figure 4 is a sectional view taken on the line 4—4 of Figure 1.

Figure 5 is a perspective view of the safety arm or lock utilized in the hook of Figures 1-4.

Figure 6 is a side elevation of another form of safety hook.

Figure 7 is an end elevation of the hook shown in Figure 6.

Figure 8 is a section taken along the line 8—8 of Figure 6 while Figure 9 is a section taken along the line 9—9 in Figure 7.

Referring in detail to the drawings, the numeral 10 designates a hook which may be made of any suitable material such as metal. The hook 10 includes a curved portion 11 which terminates in a pointed end 12, and extending from the hook 10 or formed integral therewith is a shank 14. The shank 14 includes a smooth cylindrical portion 15 and an exteriorly threaded portion 16. An annular shoulder 17 is arranged contiguous to the lower end of the smooth portion 15.

Mounted on the shank 14 is a bracket or clamp 18, and the clamp 18 is adapted to be attached to a hoisting cable, line, or the like. The clamp 18 includes a web 19 which is provided with an opening 20 for the projection therethrough of the shank 14. A suitable securing element such as a nut 21 is arranged in threaded engagement with the threaded portion 16 of the shank 14 for maintaining the parts in their assembled relation.

The hook 10 is shaped to define a throat 36 which is adapted to receive therein a sling or the like, and a latch or safety arm 22, Figure 5, is provided for preventing the sling from becoming accidentally disengaged from the throat 36. The arm 22 includes portions 23 and 24 which are arranged angularly with respect to each other, the end of the arm being provided with a cut-out 25 for receiving the pointed end 12 of the hook 10 when the arm 22 is in bridging or closing relation with respect to the throat 36.

The arm 22 is further provided with a transversely extending bore which includes a reduced diameter portion 26 and an enlarged diameter portion 27. A set screw 29 is arranged in threaded engagement with a threaded portion 28 of the arm, and the set screw 29 is provided with a kerf or slot 30 whereby a suitable tool can be used for rotating the set screw 29. Positioned within said bore is an actuating or locking pin 50 which includes a cylindrical head 31 that is slidably arranged in the enlarged portion 27 of the bore. The pin further includes a stem 32 which slidably projects through the portion 26 of the bore and an end of the stem 32 extends beyond the arm so that it can be readily engaged by a person's finger and pressed inwardly when the safety arm is to be moved into and out of its locked or unlocked position. A coil spring 33 is interposed between the set screw 29 and the head 31 for normally urging the pin away from the set screw 29. To adjust the tension of the coil spring 33, the set screw 29 can be mounted or turned by means of a suitable tool.

The arm 22 is further provided with a hub 37 having an opening 34 for rotatably receiving therein the smooth portion 15 of the shank 14. The cylindrical portion 15 of the shank 14 is provided with an arcuate recess or cut-out 35 extending tangentially to the surface of the cylindrical portion 15 and normal to the longitudinal axis of the cylindrical portion 15 of the shank, the recess being formed to receive in locking engagement the cylindrical head 31 of the pin. With the parts arranged as shown in Figures 1-4, the head 31 is snugly seated between the recess 35 and the hub 37 so that the arm 22 cannot pivot or swing on the shank 14 whereby a sling or the like is safely maintained or held in the throat 36. Then, to swing the arm 22, the user merely manually depresses the stem 32 of the pin against the coil spring 33 so that the head 31 moves out of the recess 35 whereby the arm 22 is free to rotate.

It is to be noted that in its locking position, the head 31 is engaged between the hub 37 on the arm 22 and the recessed groove 35 in the shank 14 on the hook. Any force applied to the safety arm 22 tending to rotate this upon the shank results in the head 31 being compressed and jammed between the shank and the hub, thus providing an extremely effective and positive lock. Safety hooks have been made heretofore wherein the lock was provided by a pin which merely extended through from the hub on the arm into the shank; however, a rotating force applied to the arm would merely shear off this pin and then the arm would be free to move.

In the structure previously described, the locking pin 50 moves tangentially to the cylindrical shank in a plane normal to the longitudinal axis of the shank 14; to release the pin from its locking engagement, one merely forces the pin in that direction in which the safety arm 22 is subsequently moved to open the throat 36. In Figures 6 through 9, I have shown a structure, quite similar to that shown in Figures 1–5, but wherein the actuating arm 22 is biased by a coil spring 41 into throat closing position, the spring including one end 42 engaged with the shank, and another end 43 engaged with the hub 37 on arm 22, while the web 19 is recessed as at 44 to admit the coil spring.

The hook shown in Figures 6 through 9 is further characterized in that locking pin 50 must be moved in a direction opposite to that in which the safety arm is moved into throat-opening position, thus further increasing the safety of the device. For example, referring particularly to Figure 7, pin 50 must be moved from left to right to release the locking of the safety arm 22, while safety arm 22 must be moved from right to left to open throat 36. Thus, any pressure accidentally applied to pin 50 which might perchance permit release of the lock on the arm, will tend additionally to hold the safety arm in throat-closing position rather than move it into throat-opening position, as is the case with the hook shown in Figures 1 through 5. Further, spring 41 tends to maintain the arm in throat-closing position so that its bias is provided in addition to that accidental force moving pin 50, thus providing two assurances of the safety arm remaining in throat-closing position.

From the foregoing, it is apparent that a safety hook has been provided which includes an arm 22 that can be moved into and out of closed position. A means is provided for maintaining the arm 22 in its closed or locked position. The device of the present invention may be drop forged and there is provided the full throat 36 which ensures that various sizes of slings can be received therein. Also, there will be no trouble with twisting ropes or blocks, and instant operation is ensured. Furthermore, in closed position a positive lock will be effected, and the parts can be readily replaced. The present invention can be used for snatch blocks as well as for coffin hoists.

This is a continuation-in-part of application Serial No. 303,687, filed August 11, 1952, and now abandoned.

I claim:

1. In combination; a hook provided with a throat and including a curved portion terminating in a terminal end; a shank extending from said hook and including a cylindrical portion having a longitudinal axis and a groove in the surface of said cylindrical portion extending as a chord to said surface; a safety arm including a hub mounted for rotation on said cylindrical portion and having an arm extending from the hub, said hub being rotatable on said cylindrical portion to bring said arm into and out of bridging relation to said throat and engagement with said hook terminal end, said hub having a recess therein extending as a chord to said cylindrical portion and opening into engagement with said cylindrical portion and said groove; a pin movable in said recess into and out of locking engagement with said groove; and a spring biasing said pin into groove engaging position.

2. In combination; a hook provided with a throat and including a curved portion terminating in a terminal end; a shank extending from said hook and including a cylindrical portion having a longitudinal axis and a groove in the surface of said cylindrical portion extending as a chord to said surface; a safety arm including a hub mounted for rotation on said cylindrical portion and having an arm extending from the hub, said hub being rotatable on said cylindrical portion to move said arm in a first direction into bridging relation to said throat and engagement with said hook terminal end and in a second direction opposite to said first direction to move said arm out of said bridging relation to said throat and engagement with said hook terminal end, said hub having a recess therein extending as a chord to the surface of said cylindrical portion and opening into engagement with said cylindrical portion; a pin movable in said recess in said first direction out of locking engagement with said groove; and a spring biasing said pin into groove engaging position.

3. In combination; a hook provided with a throat and including a curved portion terminating in a terminal end; a shank extending from said hook and including a cylindrical portion having a longitudinal axis and a groove in the surface of said cylindrical portion extending as a chord to said surface; a safety arm including a hub mounted for rotation on said cylindrical portion and having an arm extending from the hub, said hub being rotatable on said cylindrical portion to move said arm in a first direction into bridging relation to said throat and engagement with said hook terminal end, and in a second direction opposite to said first direction to move said arm out of said bridging relation to said throat and engagement with said hook terminal end, said hub having a recess therein extending as a chord to said cylindrical portion and opening into engagement with said cylindrical portion; a pin movable in said recess in said second direction out of locking engagement with said groove; and a spring biasing said pin into groove engaging position.

4. In combination; a hook provided with a throat and including a curved portion terminating in a terminal end; a shank extending from said hook and including a cylindrical portion having a longitudinal axis, a first portion of the surface of the cylindrical portion being recessed and being eccentrically positioned with respect to said axis; a safety arm including a hub mounted for rotation on said cylindrical portion and having an arm extending from the hub, said hub being rotatable on said cylindrical portion to bring said arm into and out of bridging relation to said throat and engagement with said hook terminal end, said hub having a passage therein extending tangentially to said cylindrical portion and opening into engagement with said first portion of said cylindrical portion; and a pin movable in said passage into and out of a locking position wherein said pin fits in the recess provided between said first portion and said hub.

5. In combination; a hook provided with a throat and including a curved portion terminating in a terminal end; a shank extending from said hook and including a cylindrical portion having a longitudinal axis, a first portion of the surface of the cylindrical portion being recessed and being eccentrically positioned with respect to said axis; a safety arm including a hub mounted for rotation on said cylindrical portion and having an arm extending from the hub, said hub being rotatable on said cylindrical portion to move said arm in a first direction into bridging relation to said throat and engagement with said hook terminal end and in a second direction opposite to said first direction to move said arm out of said bridging relation to said throat and engagement with said hook terminal end, said hub having a passage therein extending tangentially to said cylindrical portion and opening into engagement with said first portion of said cylindrical portion; and a pin movable in said passage in said first direction out of a locking position wherein said pin fits in the recess provided between said first portion and said hub.

6. In combination; a hook provided with a throat and including a curved portion terminating in a terminal end; a shank extending from said hook and including a cylindrical portion having a longitudinal axis, a first portion of the surface of the cylindrical portion being recessed and being eccentrically positioned with respect to said axis; a safety arm including a hub mounted for rotation on said cylindrical portion and having an arm extending from the hub, said hub being rotatable on said cylindrical portion to move said arm in a first direction into bridging relation to said throat and engagement with said hook terminal end and in a second direction opposite to said first direction to move said arm out of said bridging relation to said throat and engagement with said hook terminal end, said hub having a passage therein extending tangentially to said cylindrical portion and opening into engagement with said first portion of said cylindrical portion; and a pin movable in said passage in said second direction out of a locking position wherein said pin fits in the recess provided between said first portion and said hub.

7. In combination; a hook provided with a throat and including a curved portion terminating in a terminal end; a shank extending from said hook and including a cylindrical portion having a longitudinal axis and a groove in the surface of said cylindrical portion extending as a chord to said surface; a safety arm including a hub mounted for rotation on said cylindrical portion and having an arm extending from the hub, said hub being rotatable on said cylindrical portion to move said arm in a first direction into bridging relation to said throat and engagement with said hook terminal end, and in a second direction opposite to said first direction to move said arm out of said bridging relation to said throat and engagement with said hook terminal end, said hub having a recess therein extending as a chord to said cylindrical portion and opening into engagement with said cylindrical portion; a spring biasing said arm in said first direction; a pin movable in said recess in said second direction out of locking engagement with said groove; and a spring biasing said pin into groove engaging position.

References Cited in the file of this patent
UNITED STATES PATENTS

| | | |
|---|---|---|
| 1,334,830 | Bastord | Mar. 23, 1920 |

FOREIGN PATENTS

| | | |
|---|---|---|
| 174,853 | Canada | Feb. 6, 1917 |